Dec. 16, 1969  L. R. MIZELL  3,483,602
PRODUCTION OF FELTED STRUCTURES
Filed Aug 31, 1966  3 Sheets-Sheet 1
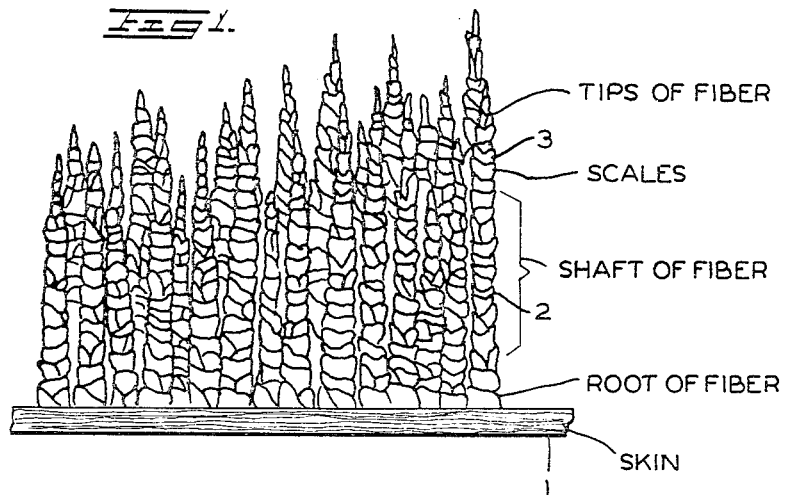
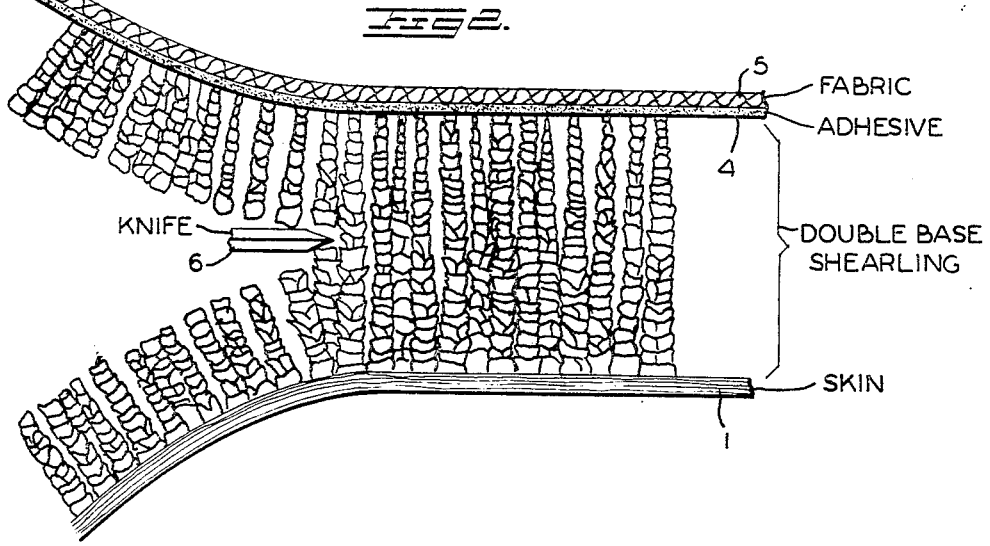
INVENTOR
LOUIS R. MIZELL
BY *Stowell & Stowell*
ATTORNEYS Dec. 16, 1969   L. R. MIZELL   3,483,602
PRODUCTION OF FELTED STRUCTURES
Filed Aug 31, 1966   3 Sheets-Sheet 2
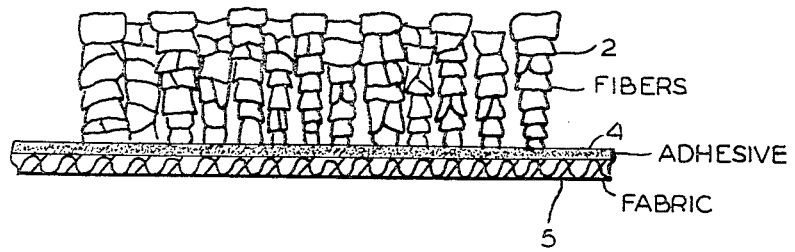
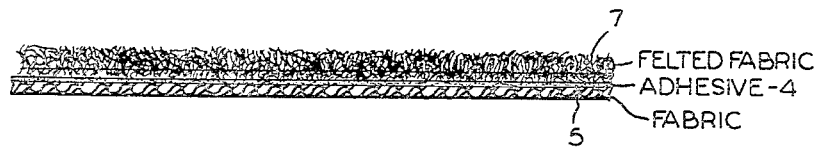
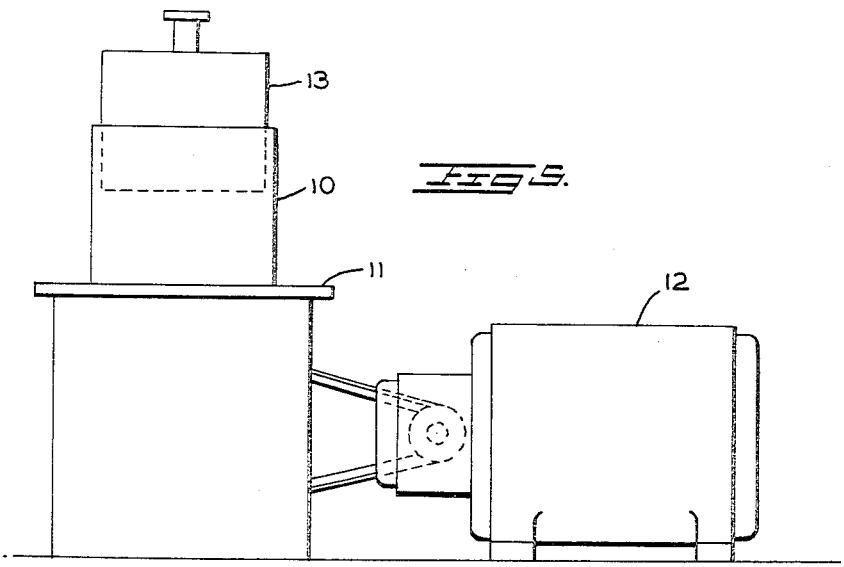
INVENTOR
LOUIS R. MIZELL
BY *Stowell & Stowell*
ATTORNEYS United States Patent Office 3,483,602
Patented Dec. 16, 1969

3,483,602
PRODUCTION OF FELTED STRUCTURES
Louis R. Mizell, Montgomery County, Md., assignor to
I.W.S. Nominee Company Limited, London, England,
a corporation of Great Britain
Filed Aug. 31, 1966, Ser. No. 576,439
Int. Cl. D04h 11/00, 17/00
U.S. Cl. 28—72.3                                    4 Claims

ABSTRACT OF THE DISCLOSURE

Felted structures are produced by subjecting to felting conditions an array of animal fibers, such as a wool fleece shearling, wherein a substantial portion of the fibers are positioned with the rootward ends thereof free and with such rootward ends of adjacent fibers in close proximity and projecting in the rootward direction while maintaining the tipward ends of a substantial portion of the fibers in adjacent relation while the array of fibers is being subjected to felting conditions.

This invention relates to the production of felted structures from animal fibers.

The felted structures and method of making them of the invention will be more particularly described with reference to the wool of sheep and lambs but the invention applies to animal fibers broadly including the hairs or furs of goats, llamas, vicunas, alpacas, mink, muskrat, rabbit, chinchilla, bear and the like, or to mixtures thereof.

Among the objects of the invention are the development of animal fiber structures of enhanced felting power; the production of new felted materials and products from wool and other animal fibers; the reduction of the time and energy now required for the production of felted structures from animal fibers, the provision of pile fabrics by the felting of animal fibers into felt or fabric bases and the provision of composite or laminated structures of animal fiber felts with materials such as plastic foam, plastic film, woven, knitted, felted and other fibrous, filamentous, porous or extended sheet materials. Other objects and advantages of the invention will be evident from the following description thereof.

In its method aspect the invention comprises broadly the subjection to felting conditions, such as agitation in the presence of moisture, of an array of animal fibers wherein a substantial portion of the fibers are positioned with at least the rootward ends thereof free and with such rootward ends of adjacent fibers in close proximity and projecting in the same general direction.

The animal fiber arrays used in the method of the invention may be prepared in a variety of ways. A particular advantageous procedure starts with an animal pelt, which may be tanned or untanned and which preferably is sheared bringing the wool or hairs to substantially uniform length. The tipward ends of the fibers on the pelt are then embedded in or adhered to a web or pellicle, which may be a film of plastic or elastomeric material, a porous, a perforated foil, or a woven or non-woven textile fabric. If an adhesive is used to adhere the tipward ends of the fibers to a web or pellicle or to form a pellicle embedding the tipward ends of the fibers, the adhesive may comprise a solution or dispersion of natural or synthetic resins or rubbers and may be thermoplastic or thermosetting or mixtures of these. The pellicle may be formed in situ by applying a film or foam forming composition to the tipward ends of the fibers, the composition being thereafter indurated by heating, cooling, solvent evaporation, catalytic curing or other means depending on the character of the applied composition.

After the tipward ends of the fibers have been adhered to or embedded in a web or pellicle, the structure thus obtained is split by passing a knife or other cutting device between the skin of the pelt and the pellicle at any desired distance to produce a natural pelt portion carrying the fibers in their original orientation and an artificial pelt portion wherein the major portion of the fibers embedded or adhered to the pellicle at their tipward ends and project therefrom in substantially parallel relation with their rootward ends free.

The principles of the invention will be more fully described in the following specific examples and with particular reference to the accompanying drawings in which:

FIG. 1 is a schematic representation of a wooled sheepskin;

FIG. 2 is a schematic representation of a wool sheepskin in the process of being converted into a natural shearling and an artificial shearling suitable for use in the method of the invention;

FIG. 3 is a schematic representation of the artificial shearling; and

FIG. 4 is a schematic representation, on a smaller scale than that of FIGS. 1 to 3, of a composite felt structure produced by the method of the invention;

FIG. 5 is an elevation view of an experimental apparatus for practising various method aspects of the invention.

Figure 6:
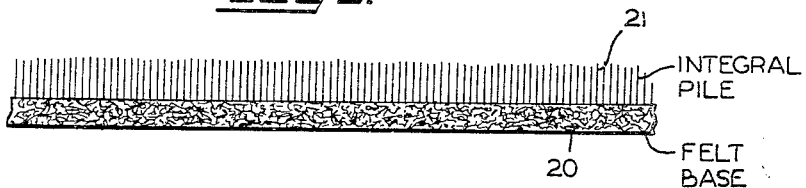
FIGS. 6, 7 and 8 are schematic representations on a scale similar to that of FIG. 4 of illustrative forms of the products of the invention.

The following are illustrative examples of the methods and products of the invention:

A raw wool sheepskin with a dense wool pile having initial fiber lengths of 3 to 5 inches is scoured and tanned. The fibers are partially straightened by "ironing" with heated rotating grooved drum to provide a wooled sheepskin as schematically illustrated in FIG. 1, wherein 1 is the skin and 2 are the fibers with scales 3 directed from the rootward ends of the fibers toward the free tipward ends.

The pile is then sheared to an approximate length of 2¼ inches. A thickened acrylic latex adhesive composition is then applied to the free ends of the fibers to cover about ⅛ inch of the fiber ends to form a continuous adhesive film over the surface of the cut pile. A sheet of textile fabric such as 8 oz./yd. woven cotton fabric is applied over the adhesive coating and the adhesive is dried and cured. The double base shearling, shown schematically on the right hand side of FIG. 2, wherein 4 is the adhesive layer and 5 is the fabric, is then cut with knife 6 approximately midway of the fibers to form the artificial shearling shown schematically in FIG. 3. Other methods of making the artificial shearlings are described in my United States patent application Ser. No. 484,240, filed Sept. 1, 1965.

When the artificial shearlings having the rootward ends of the fibers free as shown in FIG. 3, are subjected to agitation under warm moist conditions, for example, by agitating them in a Maytag automatic home washing machine in an aqueous solution containing 1.5% of sodium carbonate and 0.02% of Triton X–100 detergent at a pH of 11 and a temperature of 110° F. for 60 minutes, together with natural shearlings of the same pile length from the same sheepskin, the fibers of the artificial shearlings form a felt layer as shown at 7 in FIG. 4 with a decrease in bulk density of the fiber layer of 350 to 400%, while the fibers of the natural shearlings remain in the unfelted condition with no decrease in bulk density.

When similar artificial shearlings with the fibers anchored at the tipward ends and natural shearlings with the tipward ends of the fibers free, the fibers of both shearlings being ⅝ inch in length, are tumbled for 60 minutes in an aqueous solution of 2% sulfuric acid and 0.02% of Triton X–100 detergent in glass jars rotated end over end, the fibers of the artificial shearlings form a felt layer with a decrease in bulk density of about 250% while the fibers of the natural shearlings remain free with no decrease in bulk density.

The artificial shearlings made as described above, normally contain as much as 20% (by weight of the pile) of loose randomly distributed fibers in the pile but the felting action is not dependent on these loose fibers as an even greater decrease in bulk density is obtained when the felting operation is carried out with artificial shearlings in which the tipward ends of the fibers are fixed and the rootward ends are free and from which the loose random fibers are removed prior to the felting operation.

It has also been found that by subjecting an array of wool fibers in substantially parallel arrangement with both rootward and tipward ends free and with like ends of a major portion of the fibers adjacent to mild felting conditions, the rootward ends of the fibers felt together much more rapidly than the tipward ends resulting in a felted base from which the unfelted tipward ends project as a pile. This procedure is illustrated by the following tests carried out in a laboratory model felt hardening machine shown in FIG. 5. The machine comprises a metal cylinder 10 about 2⅝ inches in inside diameter and 3 inches deep loosely mounted on a rubber covered plate 11, which is eccentrically rotated in a horizontal plane by a motor. The material to be felted is placed in the bottom of the cylinder and wetted with an aqueous solution of 2% sulfuric acid and 0.04% of Triton X–100 detergent. A metal weight 13 about 2½ inches in outside diameter is placed on the material in the cylinder giving a pressure on the wool mass of about 0.93 pound per square inch, which is the pressure commonly applied to wool batts in conventional industrial platen and roller hardening machines. The plate 11 is rotated at the relatively slow rate of about 250 r.p.m.

When a patch of wool pile material with a pile length of ⅞ inch and having the tipward fiber ends adhered by a layer of adhesive to a cloth base is wetted, as described above, and subjected to the action of the hardening machine, the fibers of the pile form a felt layer adhered to the fabric base, as shown in FIG. 4, with an increase in bulk density of 250% in five minutes.

When an array of wool fibers having an area equivalent to the area of the cylinder of the treating machine and a fiber length of ⅞ inch is cut from a sheepskin as near the skin as possible, is wetted as above, and placed in the machine with a minimum disturbance of the natural parallel arrangement of the fibers, the rootward ends of the fibers felt together to a degree depending on the time of treatment as shown in the following table.

| Time, minutes: | Percent increase in bulk density |
| --- | --- |
| 5 | 100 |
| 10 | 123 |
| 20 | 135 |
| 30 | 187 |

Even after thirty minutes of treatment the tipward ends remain free forming, after drying and brushing, an all-wool pile structure as shown in FIG. 6, wherein 20 is the felt base and 21 is the pile.

A similar all-wool pile fabric can be made by placing a carded batt of randomly arranged wool fibers in the hardening machine and on the batt placing an array of wool fibers cut from a sheepskin, as described above, with the rootward ends of the fibers in contact with the carded batt. The rootward ends of the vertically arranged fibers and the batt of carded fibers felt together to form a felt base for the pile structure and to firmly anchor the rootward ends of the fibers while the free tipward ends of the fibers form a pile.

In another form of the invention, an array of fibers cut from a sheepskin to the desired fiber length without disturbing the vertical arrangement of the fibers is placed on a surface of a woven or knitted base fabric, such as cotton or rayon, with the rootward ends of the fibers in contact with the surface of the base fabric. When the assembly is treated in a flat bed hardening machine the rootward ends of the fibers felt with and embed into the base fabric 22 of FIG. 7, leaving the tipward ends of the fibers projecting as pile 23.

Figure 7:
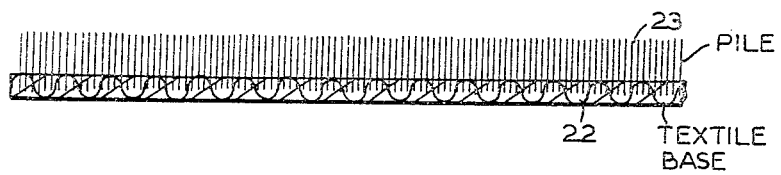
Figure 8:
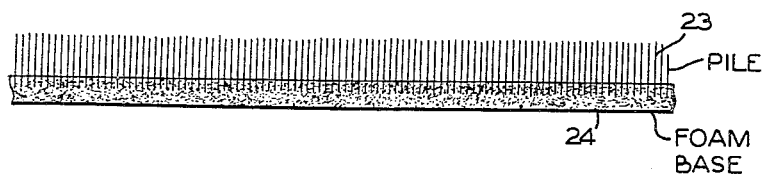

Instead of a fabric base, as in FIG. 7, the base material may be a plastic or elastic foam, as shown at 24 in FIG. 8.

A further embodiment of the invention involves the use of a temporary adhesive substance to anchor the tipward ends of the animal fibers and to maintain the fibers in the desired substantially parallel arrangement during any selected portions of the manipulations. For example, the adhesive may be one that is slowly soluble in water, such as polyvinyl alcohol, an adhesive that is soluble in alkaline solutions, such as alginate adhesive or an adhesive that is soluble in organic solvents, such as polyvinyl acetate. After the fibers have been felted at their rootward ends, by hardening, fulling, tumbling in an acid solution or by circulating a felting solution over the array of fibers, the adhesive is removed from the tipward ends of the fibers by washing in the appropriate solvent, or an adhesive may be selected which is slowly soluble in, or softened by, the felting medium so that the fiber mass can shrink in area as the fibers are felting.

The use of soluble or softenable adhesives to form a removable pellicle to which the tipward ends of the fibers are adhered or in which they are embedded is particularly useful in the formation of shaped felted articles, such as hats, felt tubes or felt footwear.

While it is usually desirable that the animal fibers be in substantial parallel arrangement, some departure from exact parallelism is possible or even desirable if the rootward ends of the fibers are in close proximity at the start of the felting operation. For example, if an array of fibers in radial arrangement in a circle with the rootward ends of the fibers directed centrally of the circle is subjected to felting conditions, as in the hardening machine hereinbefore described, the fibers rapidly felt into a tight pad with an increase in bulk density of as much as 300%.

It will be seen that a wide variety of methods may be used in practising the invention and that a wide variety of animal fiber felt structures may be produced without departing from the principles of the invention as described herein.

I claim:

1. A method of making felted structures which comprises subjecting to felting conditions an array of animal fibers wherein substantially all of said fibers are positioned with at least the rootward ends thereof free and with such rootward ends of adjacent fibers in close proximity and projecting in the rootward direction while maintaining the tipward ends of substantially all of the fibers in adjacent relation by means of an adhesive substance while the array of fibers is being subjected to felting conditions.

2. A method of making felted structures as defined in claim 1 wherein the adhesive substance is removed after the completion of the felting operation.

3. A method of making felted structures as defined in claim 1 wherein the adhesive substance is removed during the felting operation.

4. A method as defined in claim 1 wherein a substantial portion of the animal fibers is wool.

References Cited

UNITED STATES PATENTS

| 2,776,233 | 1/1957 | Roberts | 161—159 X |
| 3,042,991 | 7/1962 | Rona | 161—53 |
| 2,786,791 | 3/1957 | Vandeweghe | 156—68 |

FOREIGN PATENTS 991,399  5/1965  Great Britain.

ROBERT F. BURNETT, Primary Examiner

RAYMOND O. LINKER, Jr., Assistant Examiner

U.S. Cl. X.R.

161—53, 62